United States Patent
Lin et al.

(10) Patent No.: US 10,613,256 B2
(45) Date of Patent: Apr. 7, 2020

(54) BIOMETRIC DEVICE

(71) Applicant: INDUSTRIAL TECHNOLOGY RESEARCH INSTITUTE, Hsinchu (TW)

(72) Inventors: Ding-Zheng Lin, Taipei (TW); Yu-Ling Hsu, Taipei (TW); Yaw-Ting Wu, Taoyuan (TW); Ping-Chen Chen, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 193 days.

(21) Appl. No.: 15/854,991

(22) Filed: Dec. 27, 2017

(65) Prior Publication Data

US 2019/0049631 A1   Feb. 14, 2019

Related U.S. Application Data

(60) Provisional application No. 62/544,493, filed on Aug. 11, 2017.

(30) Foreign Application Priority Data

Dec. 20, 2017   (TW) .............................. 106144871 A

(51) Int. Cl.
*G06K 9/00* (2006.01)
*G02B 3/00* (2006.01)

(52) U.S. Cl.
CPC .......... *G02B 3/0037* (2013.01); *G06K 9/0004* (2013.01); *G06K 2009/0006* (2013.01)

(58) Field of Classification Search
CPC ..... G06K 2009/00932; G06K 9/00046; G06K 2009/0006; G06K 9/0004; G06K 9/2018;
(Continued)

(56) References Cited

U.S. PATENT DOCUMENTS 7,767,441 B2 * 8/2010 Chiou .................. C12Q 1/6804
                                                    435/287.2
8,229,179 B2 * 7/2012 Sato ..................... G06K 9/0004
                                                    250/316.1
(Continued)

FOREIGN PATENT DOCUMENTS

CN   100576574 C   12/2009
CN   101711676 A   5/2010
(Continued)

OTHER PUBLICATIONS

TW Office Action in application No. 106144871 dated Oct. 8, 2018.
(Continued)

*Primary Examiner* — Avinash Yentrapati
(74) *Attorney, Agent, or Firm* — Maschoff Brennan

(57) ABSTRACT

A biometric device includes an illuminating unit and an imaging module. The imaging module includes an optical angular selective structure and a sensing layer. The light selecting structure includes a micro lens array, a refractive layer and a light shielding layer. The refractive layer is disposed between the micro lens array and the light shielding layer. The micro lens array includes a plurality of lens unit units, and the light shielding layer has a plurality of light passing portions. The sensing layer defines multiple sensing regions which are spaced apart from each other. The light shielding layer is disposed between the refractive layer and the sensing layer. The sensing regions correspond to the light passing portions, respectively. An optical angular selective distance is defined between the light shielding layer and the sensing layer.

8 Claims, 11 Drawing Sheets

(58) Field of Classification Search
CPC .............. G06K 9/2027; G02B 3/0037; G02F 1/133603; G02F 1/133504; G02F 1/133611; G02F 1/13718; G02F 1/1368; G02F 2001/133614; G06F 3/0317; G06F 3/0321

See application file for complete search history.

(56) References Cited

U.S. PATENT DOCUMENTS

| | | | |
|---|---|---|---|
| 8,722,449 B2 | 5/2014 | Wada | |
| 10,061,964 B2* | 8/2018 | Huang | G02B 5/0242 |
| 2007/0109438 A1* | 5/2007 | Duparre | G02B 3/0012 348/335 |
| 2008/0123908 A1* | 5/2008 | Waldman | G06K 9/00046 382/124 |
| 2008/0142686 A1* | 6/2008 | Konno | H01L 27/14632 250/208.1 |
| 2009/0311774 A1* | 12/2009 | Chiou | B82Y 30/00 435/288.7 |
| 2009/0323194 A1* | 12/2009 | Lin | G02B 6/0036 359/639 |
| 2010/0302196 A1* | 12/2010 | Han | G06F 3/0425 345/173 |
| 2011/0122071 A1* | 5/2011 | Powell | G06F 3/0412 345/173 |
| 2011/0299044 A1* | 12/2011 | Yeh | H04N 9/315 353/52 |
| 2011/0317129 A1* | 12/2011 | Hsu | G02B 27/26 353/8 |
| 2012/0212662 A1* | 8/2012 | Shimoda | H04N 5/23212 348/349 |
| 2012/0225514 A1* | 9/2012 | Wada | H01L 27/14618 438/65 |
| 2012/0257031 A1* | 10/2012 | Tsuchiya | G06K 9/0004 348/77 |
| 2012/0300989 A1* | 11/2012 | Nakashima | G06K 9/00046 382/115 |
| 2016/0117543 A1* | 4/2016 | Huang | G06K 9/0004 382/124 |
| 2017/0169274 A1* | 6/2017 | Sun | G06K 9/0004 |
| 2018/0260605 A1* | 9/2018 | Wu | G06K 9/00067 |
| 2019/0049631 A1* | 2/2019 | Lin | G06K 9/0004 |

FOREIGN PATENT DOCUMENTS

| | | |
|---|---|---|
| CN | 101953689 A | 1/2011 |
| CN | 102647548 A | 8/2012 |
| CN | 102902949 A | 1/2013 |
| CN | 105549134 A | 5/2016 |
| CN | 105844212 A | 8/2016 |
| CN | 106228147 A | 12/2016 |
| CN | 106886767 A | 6/2017 |
| JP | 4802121 A | 9/2008 |
| TW | I552091 B | 10/2016 |
| TW | 201721492 A | 6/2017 |

OTHER PUBLICATIONS

Shogenji et al. "Bimodal fingerprint capturing system based on compound-eye imaging module" Applied Optics, vol. 43, No. 6 (Feb. 20, 2004).

Shogenji et al. "Multispectral imaging using compact compound optics" Optics Express, vol. 12, No. 8 (Apr. 19, 2004).

Edmund Y. Lam "Compact and Thin Multi-lens System for Machine Vision Applications" SPIE-IS&T Electronic Imaging, vol. 6813, 681305 (2008).

Roberts et al. "Angular selective semi-transparent photovoltaics" Optics Express, vol. 20, No. 4 (Feb. 13, 2012).

Rustam Zakirullin "Creating optical filters with angular-selective light transmission" Optical Society of America, vol. 54, No. 21 (Jul. 15, 2015).

* cited by examiner

BIOMETRIC DEVICE

TECHNICAL FIELD

This invention relates to a biometric device, and more particularly to a method and a compact biometric device.

BACKGROUND

Biometric recognition is a technology for biometrics authentication (or realistic authentication) by body measurements and calculations. The body measurements and calculations are related to biological characteristics, including fingerprint, palm print, veins, iris, retina and face. Nowadays, biometric recognition has been applied to many fields which require information privacy and personal safety, such as digital assistant, smart phone, desktop, debit card, digital wallet and customs authority.

A wide use of biometric recognition includes fingerprint recognition and finger vein recognition. In a conventional device for fingerprint recognition or finger vein recognition, in order to converge light from the finger onto the sensors, an optical system inside the device should satisfy thin lens formula (1/f=1/u+1/v, wherein f is a focal length of the lens, u is a distance from an object to the lens, and v is a distance from the lens to an image). A focal length of a lens satisfying thin lens formula leads to large size of the device so that it is unfavorable to apply this device on portable electronic devices. If the lens is removed, light received by the sensors is insufficient; also, light reflected by single biological characteristic, such as fingerprint or vein, is divergent toward multiple directions so that it may be received by multiple sensors, thereby outputting an image with low resolution to influence the accuracy of recognition. A useful way is to form a light passing part featuring high aspect ratio (more than 10) for preventing light divergence, thereby achieving point-to-point imaging. However, small size of hole for light passing on a light shielding layer lead to insufficient amount of light reaching the sensors; or, large size of hole for light passing leads to a demand of large thickness of the light shielding layer since high aspect ratio should be satisfied, thereby increasing both the size of device and manufacturing difficulty.

SUMMARY

This invention relates to a biometric device, to solve the problem that the conventional biometric device has overly large size.

According to one aspect of this invention, a biometric device includes a light illumination unit and an imaging module. The light illumination unit is configured to emit light toward biological characteristics, and the imaging module is configured to receive light from the light illumination unit. The imaging module includes an optical angular selecting structure and a sensing layer. The optical angular selecting structure includes a micro lens array, a refractive layer and a light shielding layer. The refractive layer is disposed between the micro lens array and the light shielding layer. The micro lens array includes a plurality of lens units, and the light shielding layer defines a plurality of light passing parts. The sensing layer is configured to receive light of the light illumination unit. The sensing layer defines a plurality of sensing regions spaced apart from each other. The light shielding layer is disposed between the refractive layer and the sensing layer. The sensing regions respectively correspond to the light passing parts, and an optical angular selective distance is defined between the light shielding layer and the sensing layer. When a radius of curvature of the lens unit is R, a diameter of the lens unit is D, a maximum height of the lens unit is LH, a distance between centers of each pair of adjacent lens units is P, a thickness of the refractive layer is H, a width of the light passing part is WO, an aspect ratio of the light passing part is AR, the optical angular selective distance is S, and a width of the sensing region is WS, the following conditions are satisfied:

$AR<1.0;$ $0.5 \leq R/D \leq 2.86;$ $0.02<WO/P<0.3;$ and $(H+LH) \times (WS-WO)/(2 \times P+WO) \leq S \leq (H+LH) \times (2 \times P-WS-WO)/(2 \times P+WO).$ According to another aspect of this invention, a biometric device includes a light illumination unit and an imaging module. The light illumination unit is configured to emit light toward biological characteristics. The imaging module is configured to receive light from the light illumination unit. The imaging module includes an optical angular selecting structure and a sensing layer. The optical angular selecting structure includes a micro lens array, a refractive layer and a light shielding layer. The refractive layer is disposed between the micro lens array and the light shielding layer. The micro lens array includes a plurality of lens units, and the light shielding layer defines a plurality of light passing parts. The sensing layer is configured to receive light of the light illumination unit. The light shielding layer is disposed between the refractive layer and the sensing layer, and an optical angular selective distance is defined between the light shielding layer and the sensing layer. When a radius of curvature of the lens unit is R, a diameter of the lens unit is D, a distance between centers of each pair of adjacent lens units is P, a width of the light passing part is WO, an aspect ratio of the light passing part is AR, and the optical angular selective distance is S, the following conditions are satisfied:

$1.0 \leq AR < 5.0;$ $0.6 < R/D \leq 2.86;$ $0.02 \leq WO/P \leq 0.5;$ and $0 \leq S < 3P.$ According to the biometric device of this invention, the aspect ratio of the light passing part is properly limited so as to be favorable for the compactness of biometric device. When several conditions, which relate to the specifications of the optical angular selecting structure and the sensing layer, are satisfied, the light with large angle of incidence at a specific lens unit is blocked by the light shielding layer; or alternatively, the light with large angle of incidence at the specific lens unit reach a non-sensing region of the sensing layer. Therefore, it is favorable for a specific sensing region corresponding to the specific lens unit only receiving light from the specific lens unit, thereby reducing crosstalk to accomplish high accuracy of biometric recognition. A configuration of the biometric device of the present disclosure is not restricted by the conventional Lensmaker's equation (or thin lens formula), and it is unnecessary to select light with proper angle of incidence by using a structure having more than 10 of aspect ratio, so as to meet the requirement of compactness.

The above description of the summary of this invention and the description of the following embodiments are provided to illustrate and explain the spirit and principles of this invention, and to provide further explanation of the scope of this invention.

DETAILED DESCRIPTION

The detailed features and advantages of the invention will be described in detail in the following description, which is intended to enable any person having ordinary skill in the art to understand the technical aspects of the present invention and to practice it. In accordance with the teachings, claims and the drawings of the invention, any person having ordinary skill in the art is able to readily understand the objectives and advantages of the invention. The following embodiments illustrate the invention in further detail, but the scope of the invention is not limited by any point of view.

Figure 1:
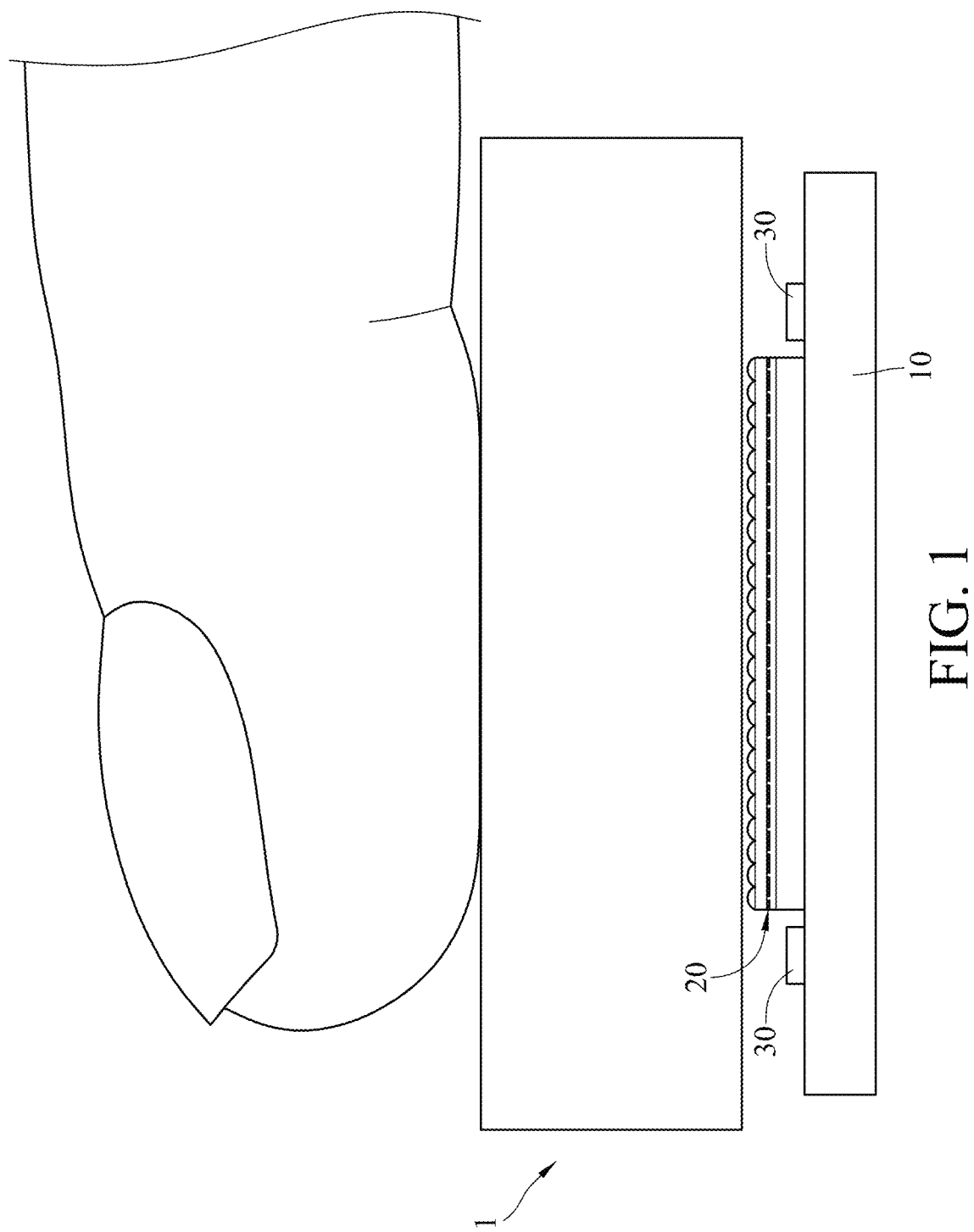
FIG. 1 is a schematic view of a biometric device according to one embodiment of the present disclosure.
Figure 2:
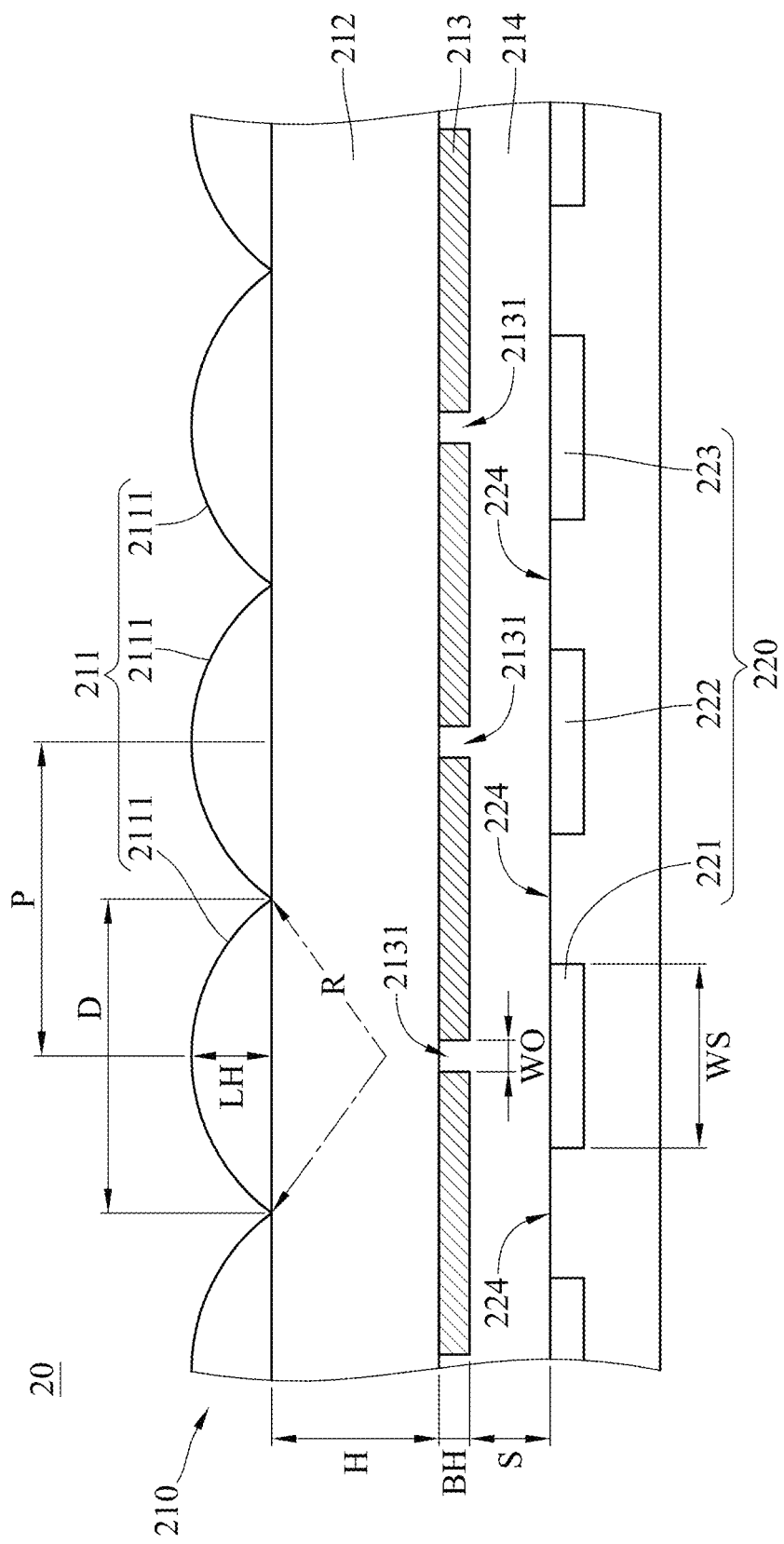
FIG. 2 is a cross-sectional view of an imaging module of the biometric device in FIG. 1.

Please refer to FIG. 1 and FIG. 2. FIG. 1 is a schematic view of a biometric device according to one embodiment of the present disclosure. FIG. 2 is a cross-sectional view of an imaging module of the biometric device in FIG. 1. In this embodiment, a biometric device 1 includes a base 10, an imaging module 20 and a light illumination unit 30. The biometric device 1 is configured to recognize the biological characteristics on an organism, such as fingerprint, finger veins and iris. The imaging module 20 and the light illumination unit 30 are disposed on the base 10, and the imaging module 20 is located at a side of the light illumination unit 30. The light illumination unit 30 is, for example but not limited to, a light emitting diode which is capable of projecting light on the biological characteristics on the organism, and the light is reflected by the biological characteristics so as to be received by the imaging module 20. FIG. 1 shows the imaging module 20 of the biometric device 1 which receives reflective light from the biological characteristics, but the present disclosure is not limited thereto. In some embodiments, the biometric device receives light passing through the biological characteristics or scattering light from the biological characteristics.

As shown in FIG. 2, the imaging module 20 includes an optical angular selecting structure 210 and a sensing layer 220. The optical angular selecting structure 210 is configured to select light having specific angle of incidence. The optical angular selecting structure 210 includes a micro lens array 211, a refractive layer 212, a light shielding layer 213 and an interlayer 214.

The micro lens array 211 includes a plurality of lens units 2111. In this embodiment, the lens units 2111 are identical and tightly arranged; that is, a ratio of a diameter D of the lens unit 2111 to a distance P between centers of each pair of adjacent lens units 2111 is 1 (D/P=1). It is worth noting that the arrangement of the lens units 2111 is not limited by the above. In some embodiments, the lens units are loosely arranged (D/P<1); or alternatively, each pair of adjacent lens units 2111 are connected together such that every lens unit 2111 is rectangular from a top view of the imaging module 20 (D/P>1). When D/P is equal to 1.414, an aperture ratio (effective area for light to pass) of the micro lens array 211 is substantially 100%.

The refractive layer 212 is, for example but not limited to, a transparent resin layer, and the micro lens array 211 is disposed on a top side of the refractive layer 212. The light shielding layer 213 is, for example but not limited to, an opaque black matrix, and the refractive layer 212 is located between the micro lens array 211 and the light shielding layer 213. The light shielding layer 213 defines a plurality of light passing parts 2131, and the light passing parts 2131 respectively correspond to the lens units 2111. The light passing part 2131 is, for example but not limited to, a through hole on the light shielding layer 213. The interlayer 214 is, for example but not limited to, an epoxy layer located between another side of the light shielding layer 213 opposite to the refractive layer 212.

The sensing layer 220 includes a plurality of sensing units 221, 222 and 223 which are, for example but not limited to, complementary metal-oxide semiconductors (CMOS). The interlayer 214 is located between the light shielding layer 213 and the sensing units 221, 222, 223 of the sensing layer 220. The light shielding layer 213 and the sensing layer 220 define an optical angular selective distance S therebetween. Each of the sensing units 221, 222, 223 has a sensing region for receiving the light reflected by the biological characteristics. The sensing regions of the sensing units 221, 222, 223 respectively correspond to the light passing parts 2131 of the light shielding layer 213. There is a non-sensing region 224 between each pair of adjacent two of the sensing units 221, 222, 223.

When the light illumination unit 30 emits light onto one of the biological characteristics, the biological characteristic reflects the light, and the reflected light travels toward the imaging module 20. The reflected light passes through the micro lens array 211, the refractive layer 212, the light passing parts 2131 of the light shielding layer 213 and the interlayer 214 in sequence so as to project onto the sensing layer 220. The sensing regions of the sensing units 221, 222, 223 receive the reflected light and generate biometric image signals. When the reflected light travels from the biological characteristic to the sensing layer 220, if a reflected light ray passing through one of the light passing parts 2131 is received by multiple sensing units (for example, the reflected light ray is received by the sensing units 222 and 223), it is difficult to accurately recognize the biological characteristics in the biometric image due to a crosstalk resulted from the biometric image signals generated by the sensing layer 220. In order to prevent the aforementioned problem as well as meet the requirement of compactness, an improvement of the configuration of the biometric device 1 is described hereafter.

As shown in FIG. 2, when an aspect ratio of each of the light passing parts 2131 (a ratio of a the thickness BH of the light shielding layer 213 to a width WO of the light passing part 2131) is AR (AR=BH/WO), the following condition is satisfied: AR<1.0. Therefore, it is favorable for preventing any manufacturing problems of the light shielding layer 213 due to an overly high aspect ratio, so as to achieve the compactness of the biometric device 1.

When a radius of curvature of each of the lens units 2111 is R, the diameter of each of the lens units 2111 is D, the distance between centers of each pair of adjacent lens units 2111 is P, the width of each of the light passing parts 2131 is WO, the optical angular selective distance between the light shielding layer 213 and the sensing layer 220 is S, a maximum height of each of the lens units 2111 is LH, a thickness of the refractive layer 212 is H, and a width of the sensing region of each of the sensing units 221, 222 and 223 is WS, the following conditions are satisfied:

$0.5 \leq R/D \leq 2.86;$ (Condition 1)

$0.02 < WO/P < 0.3;$ and (Condition 2)

$(H+LH) \times (WS-WO)/(2 \times P+WO) \leq S \leq (H+LH) \times (2 \times P-WS-WO)/(2 \times P+WO).$ (Condition 3)

When condition 1 is satisfied, it is favorable for preventing light with large angle of incidence at the lens unit 2111 from being received by multiple sensing units, so as to reduce crosstalk. Specifically, when a reflected light ray travels from the biological characteristic into the lens unit 2111 corresponding to the sensing unit 221, with larger angle of incidence at this lens unit 2111, it is ensured that this reflected light ray is unable to be received by the sensing units 222 and 223. In addition, as shown in FIG. 2, a minimum value of condition 1 (R/D) is 0.5 due to the limitation of molding process for lens unit 2111.

When condition 2 is satisfied, it is favorable for the light shielding layer 213 to block out the light with large angle of incidence at the lens unit 2111, so as to further reduce crosstalk. Specifically, when a reflected light ray travels from the biological characteristic into the lens unit 2111 corresponding to the sensing unit 221, with larger angle of incidence at this lens unit 2111, this reflected light ray is blocked by the light shielding layer 213 so as to be unable to reach the sensing units 222 and 223. Moreover, since an overly narrow light passing part 2131 may cause unfavorable diffraction of light and low light-sensing efficiency, the value of condition 2 (WO/P) is larger than 0.02.

When condition 3 is satisfied, it is ensured that the light with large angle of incidence at the lens unit 2111 reaches the non-sensing regions 224. Specifically, when a reflected light ray travels, with larger angle of incidence, into the lens unit 2111 corresponding to the sensing unit 221 and then passes through the light passing part 2131 corresponding to the sensing unit 222, this reflected light ray reaches the non-sensing regions 224 between the sensing units 222 and 223, thereby further reducing crosstalk.

By the aforementioned configuration of the biometric device 1, a sum of thicknesses of the micro lens array 211, the refractive layer 212, the light shielding layer 213, the interlayer 214 and the sensing layer 220 can be less than 3.0 millimeters (mm), such that it is favorable for the biometric device 1 enjoying the advantages of compactness and high accuracy of recognition.

Figure 3:
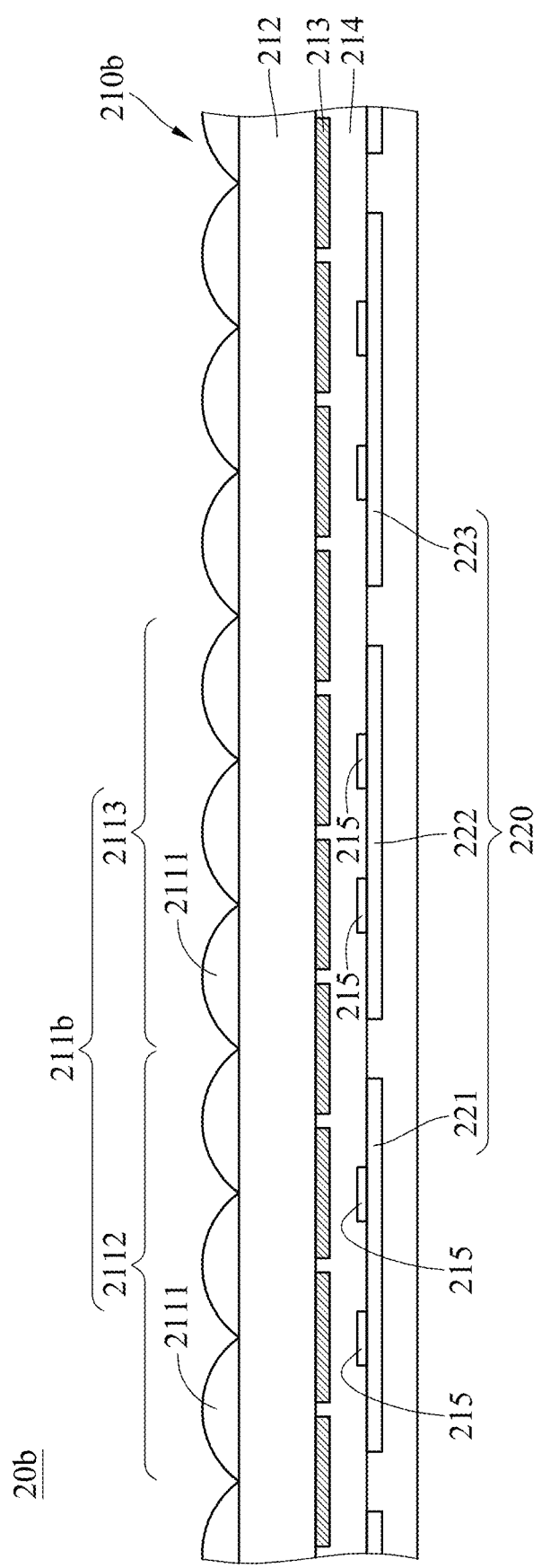
FIG. 3 is a cross-sectional view of an imaging module of a biometric device according to another embodiment of the present disclosure.

The lens units respectively correspond to the sensing units in FIG. 2, but the present disclosure is not limited to the aforementioned configuration. FIG. 3 is a cross-sectional view of an imaging module of a biometric device according to another embodiment of the present disclosure. Since this embodiment is similar to the embodiment of FIG. 2, only the differences will be illustrated hereafter.

In FIG. 3, an imaging module 20b of a biometric device includes an optical angular selecting structure 210b, and the optical angular selecting structure 210b includes a micro lens array 211b, a refractive layer 212, a light shielding layer 213, an interlayer 214 and a mask pattern 215. The micro lens array 211b includes a first lens group 2112 and a second lens group 2113, and each of the first lens group 2112 and the second lens group 2113 includes a plurality of lens units. The mask pattern 215 is disposed on the interlayer 214 to define multiple sensing regions and multiple non-sensing regions on each of the sensing units 221, 222 and 223 of the sensing layer 220. The top sides of the sensing units 221, 222 and 223 are exposed in the sensing regions and covered by the mask pattern 215 in the non-sensing regions.

The first lens group 2112 corresponds to the sensing unit 221 of the sensing layer 220, and the second lens group 2113 corresponds to the sensing unit 222 of the sensing layer 220; thus, an arrangement of the sensing units with each of them corresponding to multiple lens units is disclosed. In detail, in this embodiment, the lens units of the first lens group 2112 respectively correspond to the sensing regions of the sensing unit 221, and the lens units of the second lens group 2113 respectively correspond to the sensing regions of the sensing unit 222.

Figure 4:
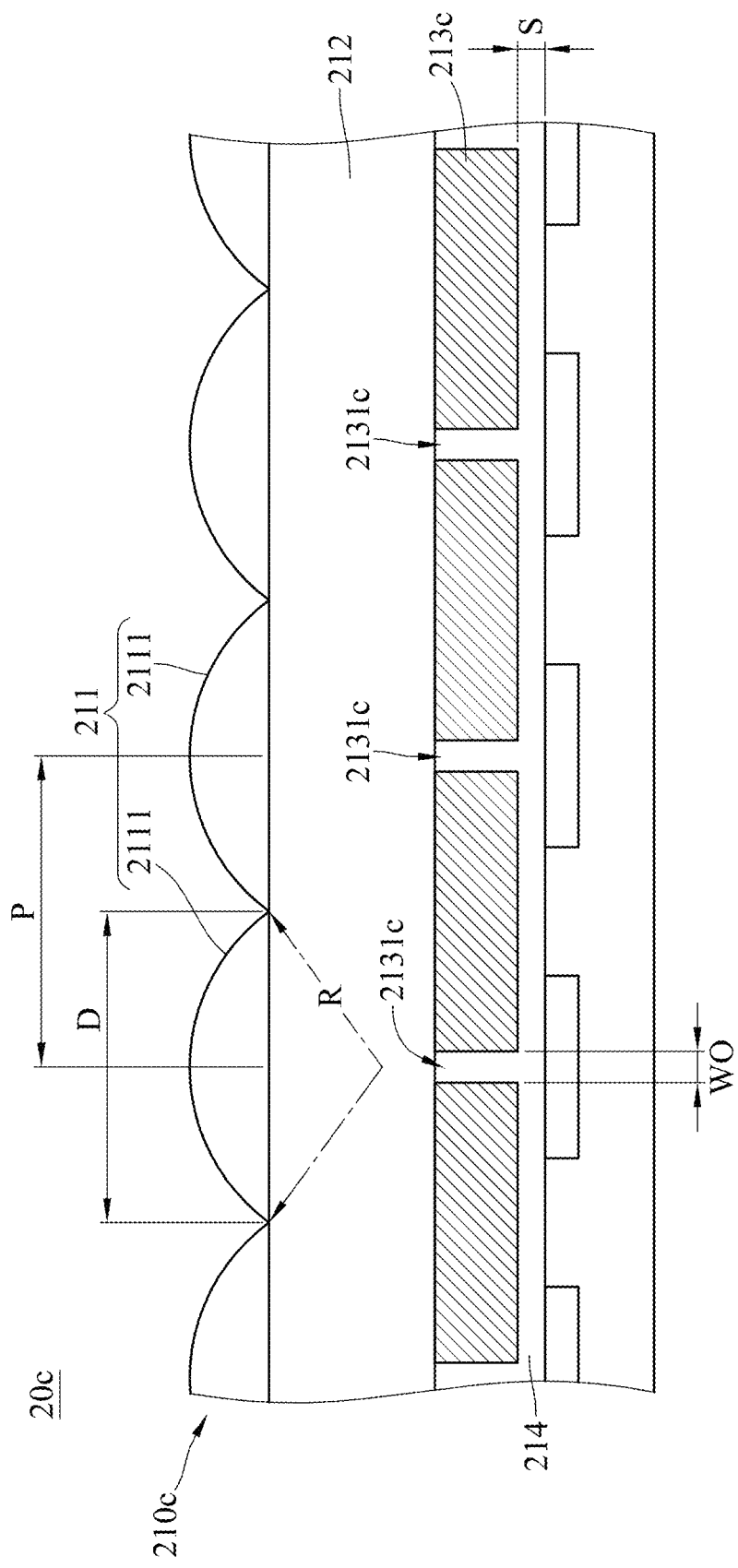
FIG. 4 is a cross-sectional view of an imaging module of a biometric device according to still another embodiment of the present disclosure.

FIG. 4 is a cross-sectional view of an imaging module of a biometric device according to still another embodiment of the present disclosure. Since this embodiment is similar to the embodiment of FIG. 2, only the differences will be illustrated hereafter. In FIG. 4, an imaging module 20c of a biometric device includes an optical angular selecting structure 210c, and the optical angular selecting structure 210c includes a micro lens array 211, a refractive layer 212, a light shielding layer 213c and an interlayer 214. When an aspect ratio of each of the light passing parts 2131c of the light shielding layer 213c is AR, the following condition is satisfied: $1.0 \leq AR < 5.0$. Therefore, it is favorable for the lateral walls of the light passing parts 2131c to prevent light from reaching multiple sensing units, so as to reduce crosstalk and keep the biometric device compact. Compared to the biometric device in FIG. 2, since the aspect ratio AR of the light passing part 2131c is different, another improvement of the configuration of the biometric device in FIG. 4 is described hereafter.

When a radius of curvature of each of the lens units 2111 of the micro lens array 211 is R, a diameter of each of the lens units 2111 is D, a distance between centers of each pair of adjacent lens units 2111 is P, a width of each of the light passing parts 2131c is WO, the aspect ratio of each of the light passing parts 2131c is AR, an optical angular selective distance between the light shielding layer 213c and the sensing layer 220 is S, and the following conditions are satisfied:

$0.6 < R/D \leq 2.86;$ (Condition 4)

$0.02 \leq WO/P \leq 0.5;$ and (Condition 5)

$0 \leq S \leq 3P.$ (Condition 6)

When conditions 4 through 6 are satisfied, it is favorable for preventing light with large angle of incidence at the lens unit 1211 from reaching multiple sensing units, so as to reduce crosstalk, thereby improving image quality.

Figure 5:
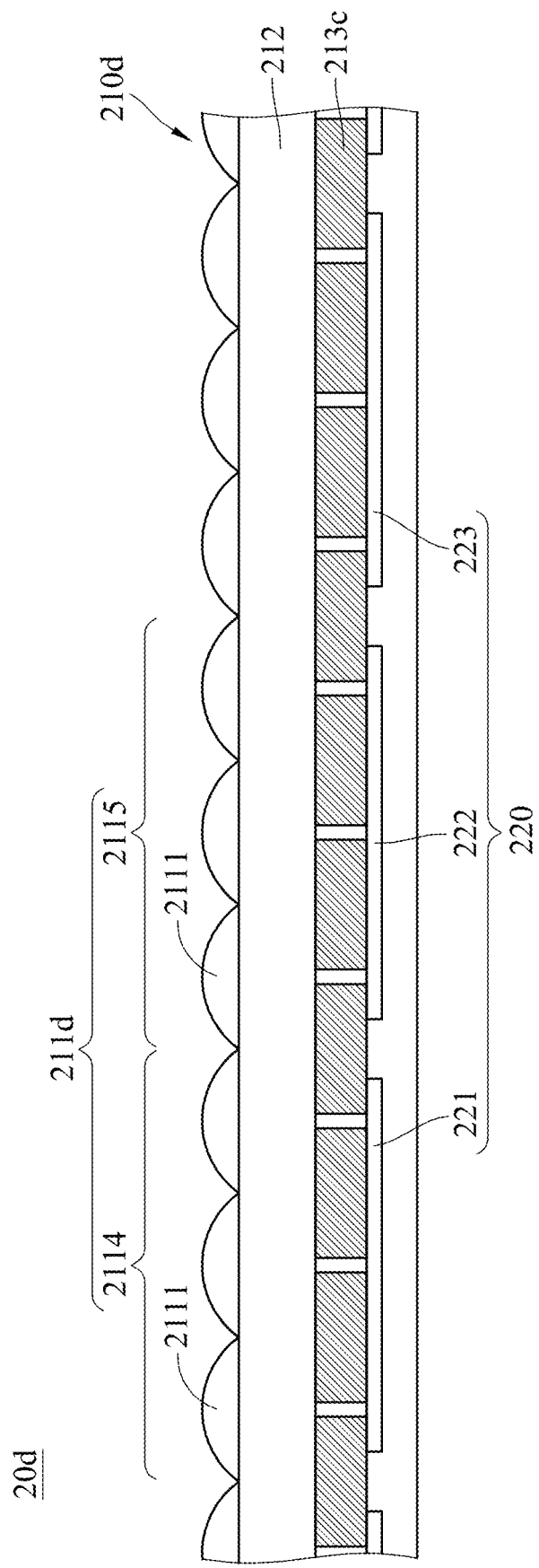
FIG. 5 is a cross-sectional view of an imaging module of a biometric device according to yet another embodiment of the present disclosure.

FIG. 5 is a cross-sectional view of an imaging module of a biometric device according to yet another embodiment of the present disclosure. Since this embodiment is similar to the embodiment of FIG. 4, only the differences will be illustrated hereafter.

In FIG. 5, an imaging module 20d of a biometric device includes an optical angular selecting structure 210d, and the optical angular selecting structure 210d includes a micro lens array 211d, a refractive layer 212 and a light shielding layer 213c. The micro lens array 211d includes a first lens group 2114 and a second lens group 2115, and each of the first lens group 2114 and the second lens group 2115 includes a plurality of lens units 2111. The light shielding layer 213c is disposed on the sensing layer 220 to define multiple sensing regions and multiple non-sensing regions on each of the sensing units 221, 222 and 223 of the sensing layer 220. The top sides of the sensing units 221, 222 and 223 are exposed in the sensing regions and covered by the light shielding layer 213c in the non-sensing regions. The first lens group 2114 corresponds to the sensing unit 221 of the sensing layer 220, and the second lens group 2115 corresponds to the sensing unit 222 of the sensing layer 220; thus, an arrangement of the sensing units with each of them corresponding to multiple lens units is disclosed.

The following specific embodiments, charts and images are provided for further explanation of the present disclosure.

First Embodiment Through Sixteenth Embodiment

Figure 6:
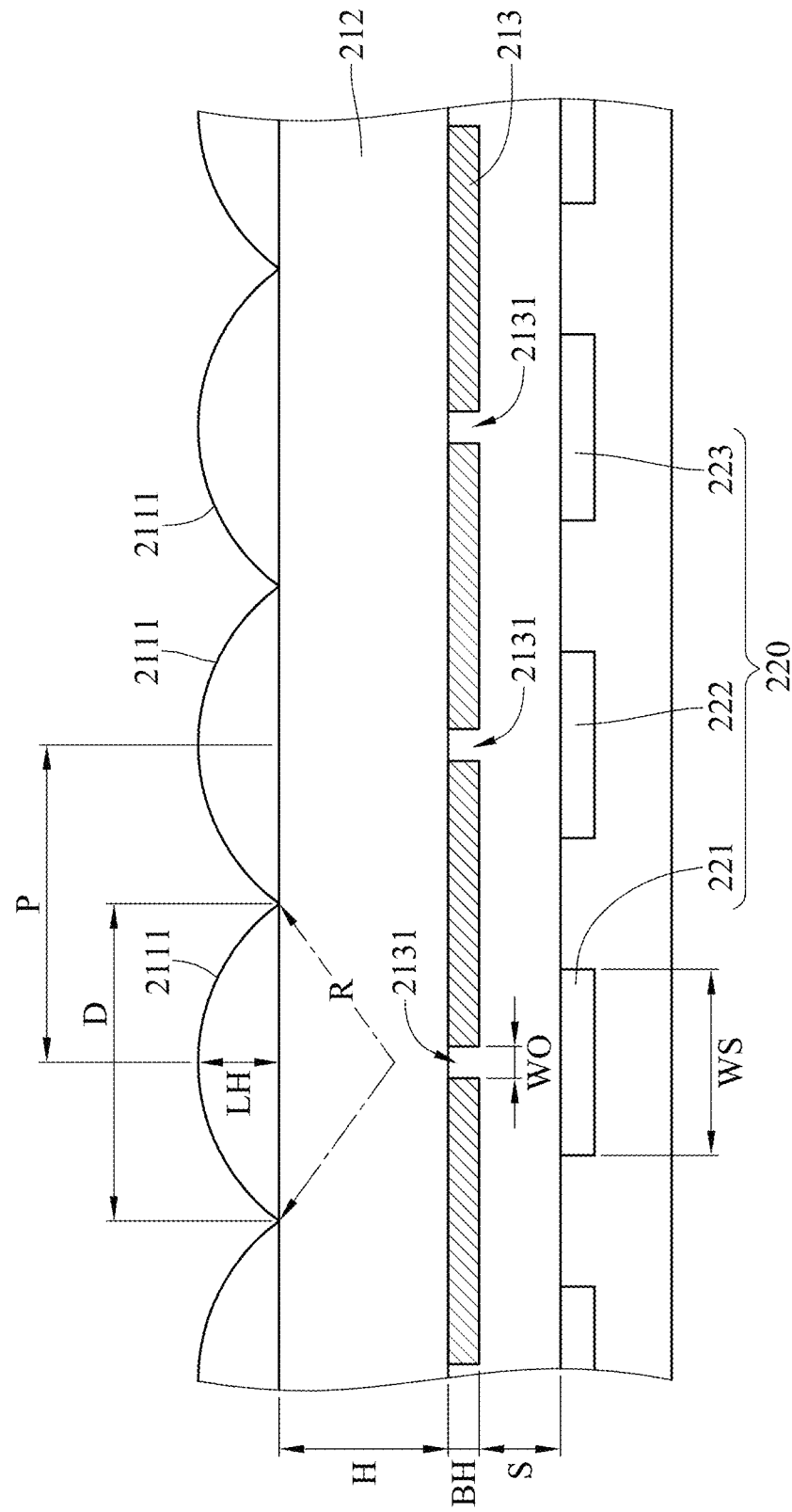
FIG. 6 is a cross-sectional view of an imaging module of a biometric device according to a first embodiment through a sixteenth embodiment of the present disclosure.

FIG. 6 is a cross-sectional view of an imaging module of a biometric device according to a first embodiment (1st EM) through a sixteenth embodiment (16th EM) of the present disclosure. Take the first embodiment as an example, the distance P between centers of each pair of adjacent lens units 2111 is 50.0 micrometers (μm), the radius of curvature R of the lens unit 2111 is 25.0 μm, the diameter D of the lens unit 2111 is 50.0 μm, and the maximum height LH of the lens unit 2111 is 25.0 μm. A refractive index of the refractive layer 212 is 1.57, and the thickness H of the refractive layer 212 is 48.00 μm. The width WO of the light passing part 2131 is 3.0 μm, the thickness BH of the light shielding layer 213 is 1.5 μm, and the aspect ratio AR of the light passing part 2131 is 0.5. The optical angular selective distance S between the light shielding layer 213 and the sensing units 221, 222, 223 of the sensing layer 220 is 16.0 μm. The width WS of the sensing region of each of the sensing units 221, 222 and 223 is 10.0 μm. The detailed information of the first embodiment through the sixteenth embodiment is shown in Table 1. In each of the sixteen embodiments, conditions 1, 2 and 3 are all satisfied.

Furthermore, Table 2 shows a first comparative embodiment (1st CEM) through a tenth comparative embodiment (10th CEM). In each of the ten comparative embodiments, at least one of conditions 1, 2 and 3 is not satisfied.

TABLE 1

|  | 1st EM | 2nd EM | 3rd EM | 4th EM | 5th EM |
| --- | --- | --- | --- | --- | --- |
| P (μm) | 50.0 | 50.0 | 50.0 | 50.0 | 50.0 |
| R (μm) | 25.0 | 79.0 | 110.0 | 120.0 | 130.0 |
| D (μm) | 50.0 | 50.0 | 50.0 | 50.0 | 50.0 |
| LH (μm) | 25.0 | 4.06 | 2.88 | 2.63 | 2.43 |
| Refractive index of refractive layer | 1.57 | 1.57 | 1.57 | 1.57 | 1.57 |
| H (μm) | 48.00 | 230.00 | 325.00 | 350.00 | 380.00 |
| WO (μm) | 3.0 | 3.0 | 3.0 | 3.0 | 3.0 |

TABLE 1-continued

| BH (μm) | 1.5 | 1.5 | 1.5 | 1.5 | 1.5 |
| --- | --- | --- | --- | --- | --- |
| AR | 0.5 | 0.5 | 0.5 | 0.5 | 0.5 |
| S (μm) | 16.0 | 75.0 | 106.0 | 116.0 | 126.0 |
| WS (μm) | 10.0 | 10.0 | 10.0 | 10.0 | 10.0 |
| R/D | 0.5 | 1.58 | 2.2 | 2.4 | 2.6 |
| WO/P | 0.06 | 0.06 | 0.06 | 0.06 | 0.06 |

|  | 6th EM | 7th EM | 8th EM | 9th EM | 10th EM |
| --- | --- | --- | --- | --- | --- |
| P (μm) | 50.0 | 50.0 | 50.0 | 50.0 | 50.0 |
| R (μm) | 140.0 | 40.0 | 40.0 | 40.0 | 40.0 |
| D (μm) | 50.0 | 50.0 | 50.0 | 50.0 | 50.0 |
| LH (μm) | 2.25 | 8.78 | 8.78 | 8.78 | 8.78 |
| Refractive index of refractive layer | 1.57 | 1.57 | 1.57 | 1.57 | 1.57 |
| H (μm) | 410.00 | 100.00 | 100.00 | 100.00 | 100.00 |
| WO (μm) | 3.0 | 2.0 | 7.5 | 12.0 | 13.0 |
| BH (μm) | 1.5 | 1.0 | 3.75 | 6.0 | 6.5 |
| AR | 0.5 | 0.5 | 0.5 | 0.5 | 0.5 |
| S (μm) | 136.0 | 44.0 | 44.0 | 44.0 | 44.0 |
| WS (μm) | 10.0 | 30.0 | 30.0 | 30.0 | 30.0 |
| R/D | 2.8 | 0.8 | 0.8 | 0.8 | 0.8 |
| WO/P | 0.06 | 0.04 | 0.15 | 0.24 | 0.26 |

|  | 11th EM | 12th EM | 13th EM | 14th EM | 15th EM |
| --- | --- | --- | --- | --- | --- |
| P (μm) | 50.0 | 50.0 | 50.0 | 50.0 | 50.0 |
| R (μm) | 40.0 | 40.0 | 40.0 | 40.0 | 40.0 |
| D (μm) | 50.0 | 50.0 | 50.0 | 50.0 | 50.0 |
| LH (μm) | 8.78 | 8.78 | 8.78 | 8.78 | 8.78 |
| Refractive index of refractive layer | 1.57 | 1.57 | 1.57 | 1.57 | 1.57 |
| H (μm) | 100.00 | 100.00 | 100.00 | 100.00 | 100.00 |
| WO (μm) | 6.0 | 6.0 | 10.0 | 7.5 | 5.0 |
| BH (μm) | 3.0 | 3.0 | 3.0 | 3.0 | 3.0 |
| AR | 0.5 | 0.5 | 0.3 | 0.4 | 0.6 |
| S (μm) | 30.0 | 44.0 | 50.0 | 50.0 | 50.0 |
| WS (μm) | 30.0 | 30.0 | 30.0 | 30.0 | 30.0 |
| R/D | 0.8 | 0.8 | 0.8 | 0.8 | 0.8 |
| WO/P | 0.12 | 0.12 | 0.2 | 0.15 | 0.1 |

|  | 16th EM |
| --- | --- |
| P (μm) | 50.0 |
| R (μm) | 40.0 |
| D (μm) | 50.0 |
| LH (μm) | 8.78 |
| Refractive index of refractive layer | 1.57 |
| H (μm) | 100.00 |
| WO (μm) | 7.5 |
| BH (μm) | 3.0 |
| AR | 0.002 |
| S (μm) | 50.0 |
| WS (μm) | 30.0 |
| R/D | 0.8 |
| WO/P | 0.15 |

TABLE 2

|  | 1st CEM | 2nd CEM | 3th CEM | 4th CEM | 5th CEM |
| --- | --- | --- | --- | --- | --- |
| P (μm) | 50.0 | 50.0 | 50.0 | 50.0 | 50.0 |
| R (μm) | 150.0 | 180.0 | 40.0 | 40.0 | 40.0 |
| D (μm) | 50.0 | 50.0 | 50.0 | 50.0 | 50.0 |
| LH (μm) | 2.10 | 1.74 | 8.78 | 8.78 | 8.78 |
| Refractive index of refractive layer | 1.57 | 1.57 | 1.57 | 1.57 | 1.57 |
| H (μm) | 450.00 | 530.00 | 100.00 | 100.00 | 100.00 |
| WO (μm) | 3.0 | 3.0 | 0.5 | 1.0 | 15.0 |
| BH (μm) | 1.5 | 1.5 | 0.25 | 0.5 | 7.5 |
| AR | 0.5 | 0.5 | 0.5 | 0.5 | 0.5 |
| S (μm) | 150.0 | 180.0 | 44.0 | 44.0 | 44.0 |

TABLE 2-continued

| | | | | | |
|---|---|---|---|---|---|
| WS(μm) | 10.0 | 10.0 | 30.0 | 30.0 | 30.0 |
| R/D | 3.0 | 3.6 | 0.8 | 0.8 | 0.8 |
| WO/P | 0.06 | 0.06 | 0.01 | 0.02 | 0.3 |

| | 6th CEM | 7th CEM | 8th CEM | 9th CEM | 10th CEM |
|---|---|---|---|---|---|
| P (μm) | 50.0 | 50.0 | 50.0 | 50.0 | 50.0 |
| R (μm) | 40.0 | 40.0 | 40.0 | 40.0 | 40.0 |
| D (μm) | 50.0 | 50.0 | 50.0 | 50.0 | 50.0 |
| LH (μm) | 8.78 | 8.78 | 8.78 | 8.78 | 8.78 |
| Refractive index of refractive layer | 1.57 | 1.57 | 1.57 | 1.57 | 1.57 |
| H (μm) | 100.00 | 100.00 | 100.00 | 100.00 | 100.00 |
| WO (μm) | 20.0 | 30.0 | 6.0 | 6.0 | 6.0 |
| BH (μm) | 10.0 | 15.0 | 3.0 | 3.0 | 3.0 |
| AR | 0.5 | 0.5 | 0.5 | 0.5 | 0.5 |
| S (μm) | 44.0 | 44.0 | 15.0 | 62.0 | 65.0 |
| WS (μm) | 30.0 | 30.0 | 30.0 | 30.0 | 30.0 |
| R/D | 0.8 | 0.8 | 0.8 | 0.8 | 0.8 |
| WO/P | 0.4 | 0.6 | 0.12 | 0.12 | 0.12 |

Figure 7:
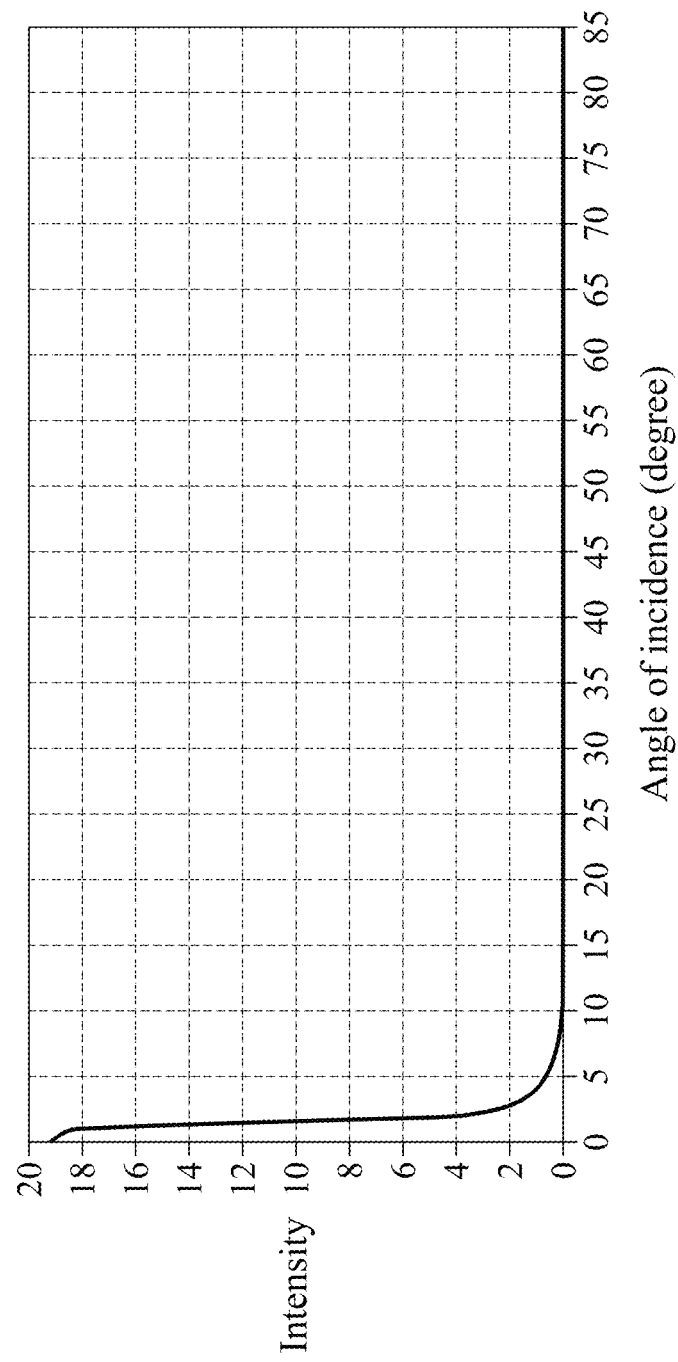
FIG. 7 is a chart showing an intensity of light, received by a sensing unit of the biometric device according to the first embodiment, versus an angle of incidence.
Figure 8:
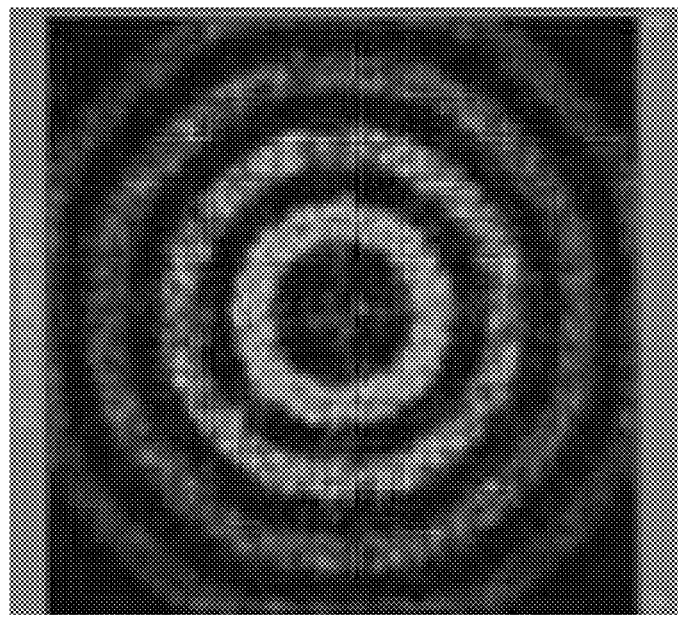
FIG. 8 is a biometric image according to the first embodiment of the present disclosure.

FIG. 7 is a chart showing an intensity of light, received by a sensing unit of the biometric device according to the first embodiment, versus an angle of incidence. FIG. 8 is a biometric image according to the first embodiment of the present disclosure. When multiple light rays (or reflected light rays) travel from the biological characteristic into the imaging module of the biometric device, the light rays, with smaller angle of incidence at the lens unit, reach a corresponding sensing unit, and other light rays, with larger angle of incidence at the lens unit, do not reach the corresponding sensing unit. Therefore, the intensity distribution in FIG. 7 includes a high peak at small angle of incidence. The imaging module in the first embodiment receives the light rays to generate a biometric image of FIG. 8 with high resolution, and the biological characteristics, such as fingerprint and vein, are clearly recognized in this biometric image. Similarly, the imaging modules in the second embodiment through the sixteenth embodiment are able to generate biometric images with high resolution.

Figure 9:
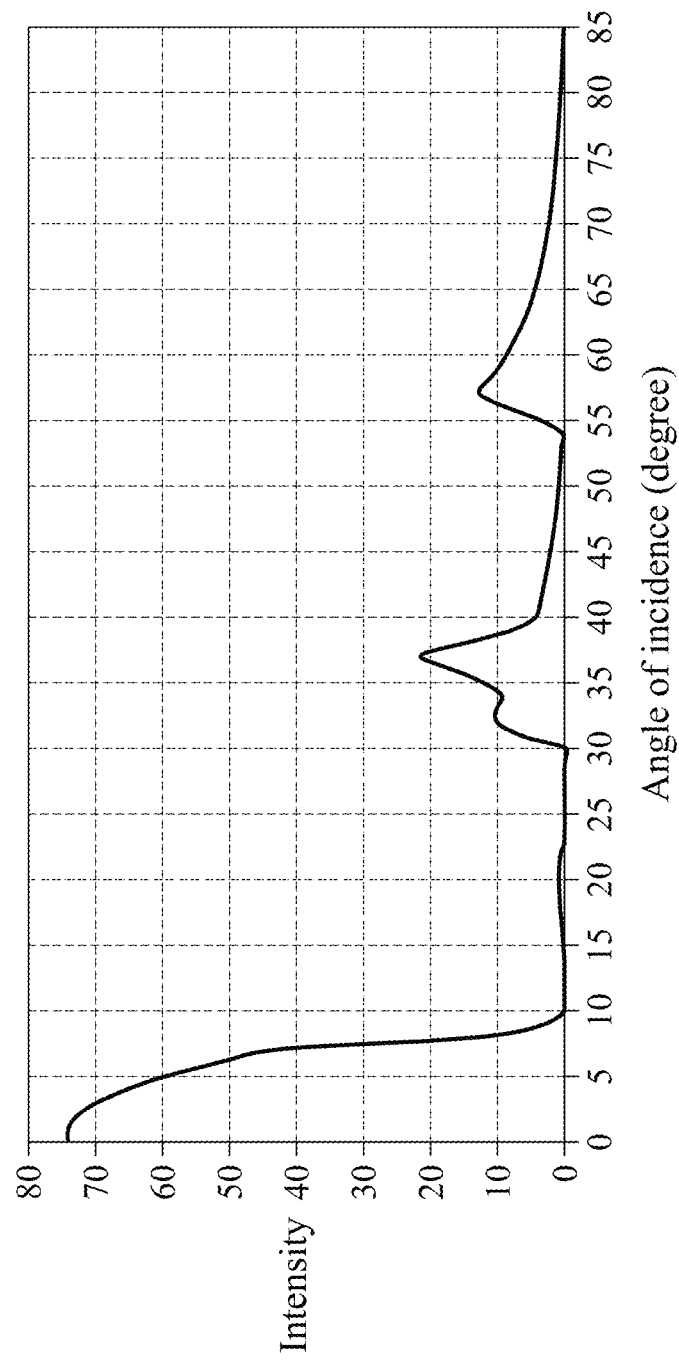
FIG. 9 is a chart showing an intensity of light, received by a sensing unit of the biometric device according to a sixth comparative embodiment, versus an angle of incidence.
Figure 10:
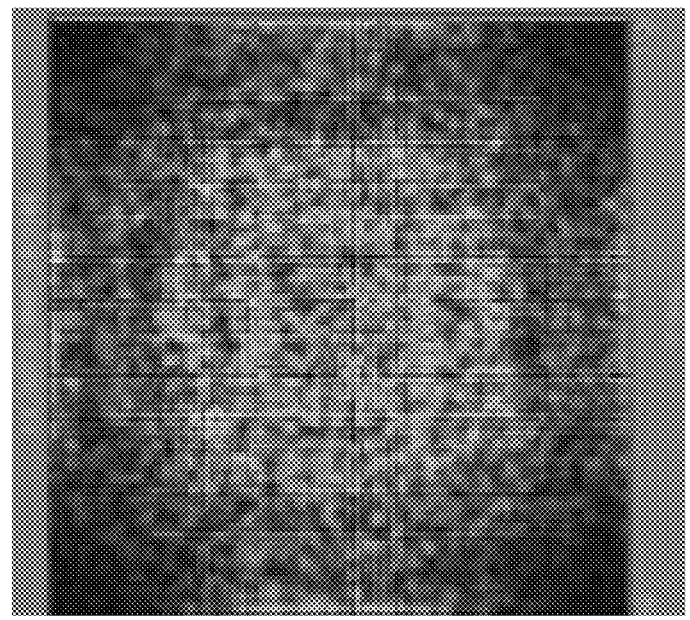
FIG. 10 is a biometric image according to the sixth comparative embodiment.

FIG. 9 is a chart showing an intensity of light, received by a sensing unit of the biometric device according to a sixth comparative embodiment, versus an angle of incidence. FIG. 10 is a biometric image according to the sixth comparative embodiment. Compared to the first embodiment, conditions 2 and 3 are not satisfied in the sixth comparative embodiment. Since conditions 2 and 3 are not satisfied, the light rays, with larger angle of incidence at the lens unit, reach the corresponding sensing unit. Therefore, the intensity distribution in FIG. 9 includes multiple high peaks at small angle of incidence (less than 3 degrees of angle of incidence) and large angle of incidence (about 37 degrees and 57 degrees of angle of incidence), thereby causing crosstalk. The imaging module in the sixth comparative embodiment receives the light rays to generate a biometric image of FIG. 10 with low resolution, and it is difficult to recognize the biological characteristics in this biometric image. Similarly, the imaging modules in the first through fifth comparative embodiments and the seventh through tenth comparative embodiments generate biometric images with low resolution.

Seventeenth Embodiment Through Thirty-Sixth Embodiment

Figure 11:
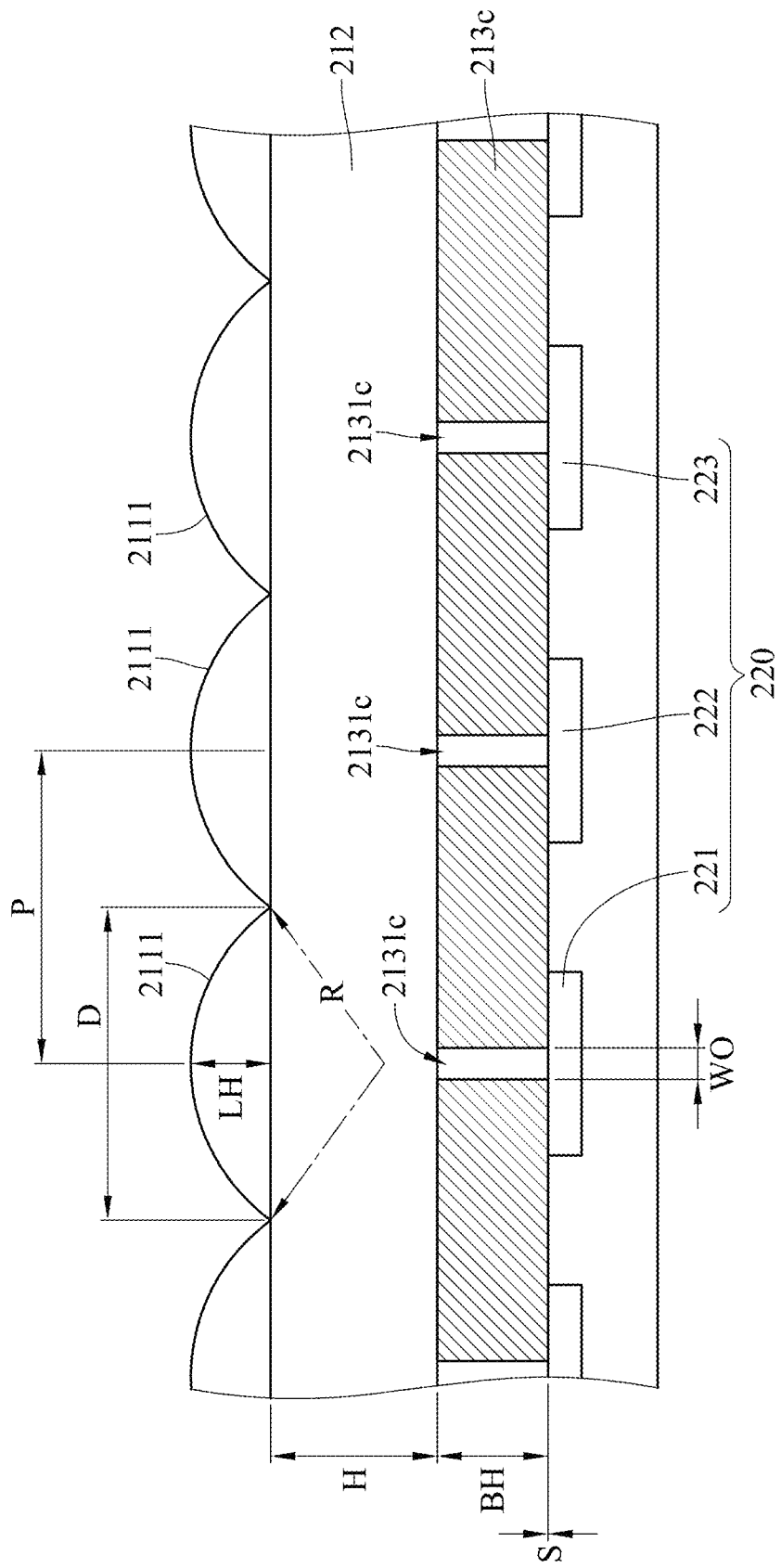
FIG. 11 is a cross-sectional view of an imaging module of a biometric device according to a seventeenth embodiment through a thirty-sixth embodiment of the present disclosure.

FIG. 11 is a cross-sectional view of an imaging module of a biometric device according to a seventeenth embodiment (17th EM) through a thirty-sixth embodiment (36th EM) of the present disclosure. Take the seventeenth embodiment as an example, the distance P between centers of each pair of adjacent lens units 2111 is 50.0 μm, the radius of curvature R of the lens unit 2111 is 40.0 μm, the diameter D of the lens unit 2111 is 40.0 μm, and the maximum height LH of the lens unit 2111 is 5.36 μm. A refractive index of the refractive layer 212 is 1.57, and the thickness H of the refractive layer 212 is 110.00 μm. The width WO of the light passing part 2131c is 3.0 μm, the thickness BH of the light shielding layer 213c is 15.0 μm, and the aspect ratio AR of the light passing part 2131c is 5.0. The optical angular selective distance S between the light shielding layer 213c and the sensing units 221, 222, 223 of the sensing layer 220 is 0 μm; that is, the light shielding layer 213c directly contact the sensing units 221, 222, 223. The detailed information of the seventeenth embodiment through the thirty-sixth embodiment is shown in Table 3. In each of the twenty embodiments, conditions 4, 5 and 6 are all satisfied.

Furthermore, Table 4 shows an eleventh comparative embodiment (11th CEM) through an eighteenth comparative embodiment (18th CEM). In each of the eight comparative embodiments, at least one of conditions 4, 5 and 6 is not satisfied.

TABLE 3

| | 17th EM | 18th EM | 19th EM | 20th EM |
|---|---|---|---|---|
| P (μm) | 50.0 | 50.0 | 50.0 | 50.0 |
| R (μm) | 40.0 | 60.0 | 80.0 | 100.0 |
| D (μm) | 40.0 | 40.0 | 40.0 | 40.0 |
| LH (μm) | 5.36 | 3.43 | 2.54 | 2.02 |
| Refractive index of refractive layer | 1.57 | 1.57 | 1.57 | 1.57 |
| H (μm) | 110.00 | 173.00 | 230.00 | 295.00 |
| WO (μm) | 3.0 | 3.0 | 3.0 | 3.0 |
| BH (μm) | 15.0 | 15.0 | 15.0 | 15.0 |
| AR | 5.0 | 5.0 | 5.0 | 5.0 |
| S (μm) | 0 | 0 | 0 | 0 |
| R/D | 1.0 | 1.5 | 2.0 | 2.5 |
| WO/P | 0.06 | 0.06 | 0.06 | 0.06 |

| | 21st EM | 22nd EM | 23rd EM | 24th EM |
|---|---|---|---|---|
| P (μm) | 50.0 | 50.0 | 50.0 | 50.0 |
| R (μm) | 112.0 | 40.0 | 40.0 | 40.0 |
| D (μm) | 40.0 | 40.0 | 40.0 | 40.0 |
| LH (μm) | 1.80 | 5.36 | 5.36 | 5.36 |
| Refractive index of refractive layer | 1.57 | 1.57 | 1.57 | 1.57 |
| H (μm) | 335.00 | 110.00 | 110.00 | 110.00 |
| WO (μm) | 3.0 | 1.5 | 5.0 | 15.0 |
| BH (μm) | 15.0 | 4.5 | 15.0 | 45.0 |
| AR | 5.0 | 3.0 | 3.0 | 3.0 |
| S (μm) | 0 | 0 | 0 | 0 |
| R/D | 2.8 | 1.0 | 1.0 | 1.0 |
| WO/P | 0.06 | 0.03 | 0.1 | 0.3 |

| | 25th EM | 26th EM | 27th EM | 28th EM |
|---|---|---|---|---|
| P (μm) | 50.0 | 50.0 | 50.0 | 50.0 |
| R (μm) | 40.0 | 40.0 | 40.0 | 40.0 |
| D (μm) | 40.0 | 40.0 | 40.0 | 40.0 |
| LH (μm) | 5.36 | 5.36 | 5.36 | 5.36 |
| Refractive index of refractive layer | 1.57 | 1.57 | 1.57 | 1.57 |
| H (μm) | 110.00 | 110.00 | 110.00 | 110.00 |
| WO (μm) | 22.5 | 25.0 | 5.0 | 5.0 |
| BH (μm) | 67.5 | 75.0 | 15.0 | 15.0 |
| AR | 3.0 | 3.0 | 3.0 | 3.0 |
| S (μm) | 0 | 0 | 0 | 5.0 |
| R/D | 1.0 | 1.0 | 1.0 | 1.0 |
| WO/P | 0.45 | 0.5 | 0.1 | 0.1 |

TABLE 3-continued

| | 29th EM | 30th EM | 31st EM | 32nd EM |
|---|---|---|---|---|
| P (µm) | 50.0 | 50.0 | 50.0 | 50.0 |
| R (µm) | 40.0 | 40.0 | 40.0 | 40.0 |
| D (µm) | 40.0 | 40.0 | 40.0 | 40.0 |
| LH (µm) | 5.36 | 5.36 | 5.36 | 5.36 |
| Refractive index of refractive layer | 1.57 | 1.57 | 1.57 | 1.57 |
| H (µm) | 110.00 | 110.00 | 110.00 | 110.00 |
| WO (µm) | 5.0 | 5.0 | 5.0 | 5.0 |
| BH (µm) | 15.0 | 15.0 | 15.0 | 15.0 |
| AR | 3.0 | 3.0 | 3.0 | 3.0 |
| S (µm) | 10.0 | 15.0 | 20.0 | 25.0 |
| R/D | 1.0 | 1.0 | 1.0 | 1.0 |
| WO/P | 0.1 | 0.1 | 0.1 | 0.1 |

| | 33rd EM | 34th EM | 35th EM | 36th EM |
|---|---|---|---|---|
| P (µm) | 50.0 | 50.0 | 50.0 | 50.0 |
| R (µm) | 40.0 | 40.0 | 36.0 | 48.0 |
| D (µm) | 40.0 | 40.0 | 50.0 | 50.0 |
| LH (µm) | 5.36 | 5.36 | 10.1 | 7.02 |
| Refractive index of refractive layer | 1.57 | 1.57 | 1.57 | 1.57 |
| H (µm) | 110.00 | 110.00 | 90.00 | 130.00 |
| WO (µm) | 5.0 | 5.0 | 2.5 | 2.5 |
| BH (µm) | 15.0 | 15.0 | 3.0 | 3.0 |
| AR | 3.0 | 3.0 | 1.2 | 1.2 |
| S (µm) | 50.0 | 100.0 | 10.0 | 10.0 |
| R/D | 1.0 | 1.0 | 0.72 | 0.96 |
| WO/P | 0.1 | 0.1 | 0.05 | 0.05 |

TABLE 4

| | 11th CEM | 12th CEM | 13th CEM | 14th CEM |
|---|---|---|---|---|
| P (µm) | 50.0 | 50.0 | 50.0 | 50.0 |
| R (µm) | 20.0 | 24.0 | 120.0 | 200.0 |
| D (µm) | 40.0 | 40.0 | 40.0 | 40.0 |
| LH (µm) | 20.0 | 10.73 | 1.68 | 1.0 |
| Refractive index of refractive layer | 1.57 | 1.57 | 1.57 | 1.57 |
| H (µm) | 40.00 | 60.00 | 350.00 | 600.00 |
| WO (µm) | 3.0 | 3.0 | 3.0 | 3.0 |
| BH (µm) | 15.0 | 15.0 | 15.0 | 15.0 |
| AR | 5.0 | 5.0 | 5.0 | 5.0 |
| S (µm) | 0 | 0 | 0 | 0 |
| R/D | 0.5 | 0.6 | 3.0 | 5.0 |
| WO/P | 0.06 | 0.06 | 0.06 | 0.06 |

| | 15th CEM | 16th CEM | 17th CEM | 18th CEM |
|---|---|---|---|---|
| P (µm) | 50.0 | 50.0 | 50.0 | 50.0 |
| R (µm) | 40.0 | 40.0 | 40.0 | 40.0 |
| D (µm) | 40.0 | 40.0 | 40.0 | 40.0 |
| LH (µm) | 5.36 | 5.36 | 5.36 | 5.36 |
| Refractive index of refractive layer | 1.57 | 1.57 | 1.57 | 1.57 |
| H (µm) | 110.00 | 110.00 | 110.00 | 110.00 |
| WO (µm) | 0.5 | 30.0 | 5.0 | 5.0 |
| BH (µm) | 1.5 | 90.0 | 15.0 | 15.0 |
| AR | 3.0 | 3.0 | 3.0 | 3.0 |
| S (µm) | 0 | 0 | 150.0 | 200.0 |
| R/D | 1.0 | 1.0 | 1.0 | 1.0 |
| WO/P | 0.01 | 0.6 | 0.1 | 0.1 |

According to the disclosure, the aspect ratio of the light passing part is properly limited so as to be favorable for the compactness of biometric device. When several conditions, which relate to the specifications of the optical angular selecting structure and the sensing layer, are satisfied, the light with large angle of incidence at a specific lens unit is blocked by the light shielding layer; or alternatively, the light with large angle of incidence at the specific lens unit reach a non-sensing region of the sensing layer. Therefore, it is favorable for a specific sensing region corresponding to the specific lens unit only receiving light from the specific lens unit, thereby reducing crosstalk to accomplish high accuracy of recognition. A configuration of the biometric device of the present disclosure is not restricted by the conventional Lensmaker's equation (or thin lens formula), and it is unnecessary to select light with proper angle of incidence by using a structure having more than 10 of aspect ratio, so as to meet the requirement of compactness.

Although the aforementioned embodiments of this invention have been described above, this invention is not limited thereto. The amendment and the retouch, which do not depart from the spirit and scope of this invention, should fall within the scope of protection of this invention. For the scope of protection defined by this invention, please refer to the attached claims.

SYMBOLIC EXPLANATION 1 biometric device
10 base
20, 20b, 20c, 20d imaging module
210, 210b, 210c, 210d optical angular selective structure
211, 211b, 211d micro lens array
2111 lens unit
2112, 2114 first lens group
2113, 2115 second lens group
212 refractive layer
213, 213c light shielding layer
2131, 2131c light passing part
214 Interlayer
215 mask pattern
220 sensing layer
221, 222, 223 sensing unit
224 non-sensing region
30 light illumination unit
BH thickness of light shielding layer
D diameter of lens unit
H thickness of refractive layer
LH maximum height of lens unit
P distance between centers of each pair of adjacent lens units
R radius of curvature of lens unit
S optical angular selective distance
WO width of light passing part
WS width of sensing region of sensing unit

What is claimed is:
1. A biometric device, comprising:
a light illumination unit configured to emit light toward biological characteristics; and
an imaging module configured to receive light from the light illumination unit, the imaging module comprising:
an optical angular selecting structure comprising a micro lens array, a refractive layer and a light shielding layer, the refractive layer being disposed between the micro lens array and the light shielding layer, the micro lens array comprising a plurality of lens units, and the light shielding layer defining a plurality of light passing parts; and
a sensing layer configured to receive light of the light illumination unit, the sensing layer defining a plurality of sensing regions spaced apart from each other, the light shielding layer being disposed between the refractive layer and the sensing layer, the sensing regions respectively corresponding to the light passing parts, and an optical angular selective distance being defined between the light shielding layer and the sensing layer;

wherein a radius of curvature of the lens unit is R, a diameter of the lens unit is D, a maximum height of the lens unit is LH, a distance between centers of each pair of adjacent lens units is P, a thickness of the refractive layer is H, a width of the light passing part is WO, an aspect ratio of the light passing part is AR, the optical angular selective distance is S, a width of the sensing region is WS, and the following conditions are satisfied:

$AR<1.0;$ $0.5 \leq R/D \leq 2.86;$ $0.02<WO/P<0.3;$ and $(H+LH) \times (WS-WO)/(2 \times P+WO) \leq S \leq (H+LH) \times (2 \times P-WS-WO)/(2 \times P+WO).$

2. The biometric device according to claim 1, wherein the diameter of the lens unit is 35.0 μm, and the radius of curvature of the lens unit is from 17.5 μm to 100.0 μm.

3. The biometric device according to claim 1, wherein a distance between centers of each pair of adjacent sensing regions is 50.0 μm, and the width of the light passing part is from 1.0 μm to 15.0 μm.

4. The biometric device according to claim 1, wherein the distance between centers of each pair of adjacent lens units is 50.0 μm, the radius of curvature of the lens unit is 40.0 μm, the width of the light passing part is 6.0 μm, the thickness of the refractive layer is 100.0 μm, and the optical angular selective distance between the light shielding layer and the sensing layer is from 23.0 μm to 61.0 μm.

5. The biometric device according to claim 1, wherein the optical angular selecting structure further comprises an interlayer disposed between the light shielding layer and the sensing layer, the optical angular selective distance is defined by the interlayer, and a sum of thicknesses of the micro lens array, the refractive layer, the light shielding layer, the interlayer and the sensing layer is less than 3.0 mm.

6. The biometric device according to claim 1, wherein the radii of curvature of the lens units are equal to each other.

7. The biometric device according to claim 1, wherein the sensing layer comprises a plurality of sensing units spaced apart from each other, the plurality of sensing units defines the plurality of sensing regions, and the sensing units respectively correspond to the lens units.

8. The biometric device according to claim 1, wherein the sensing layer comprises a first sensing unit and a second sensing unit spaced apart from each other, the first sensing unit defines some of the sensing regions, the second sensing unit defines some other of the sensing regions, the plurality of lens units comprises a first lens group and a second lens group, and the first lens group and the second lens group respectively correspond to the first sensing unit and the second sensing unit.

\* \* \* \* \*